United States Patent [19]
Cobb

[11] Patent Number: 5,121,929
[45] Date of Patent: Jun. 16, 1992

[54] GASKET WITH ENCASED LOAD SENSOR

[75] Inventor: David A. Cobb, Hazelcrest, Ill.

[73] Assignee: Fel-Pro Incorporated, Skokie, Ill.

[21] Appl. No.: 719,742

[22] Filed: Jun. 24, 1991

[51] Int. Cl.⁵ .......................... F16J 15/00; G01B 7/16
[52] U.S. Cl. ........................................ 277/2; 277/233;
277/235 B; 73/768; 73/775; 73/862.48
[58] Field of Search .......... 277/2, 166, 235 R, 235 B;
73/768, 775, 862.47, 862.48

[56] References Cited
U.S. PATENT DOCUMENTS

| | | | |
|---|---|---|---|
| 3,358,257 | 12/1967 | Painter et al. | 73/775 |
| 3,783,173 | 1/1974 | Twomey | 277/235 R |
| 4,734,034 | 3/1988 | Maness et al. | 433/68 |
| 4,817,969 | 4/1989 | McDowell et al. | 277/235 B |
| 4,856,993 | 8/1989 | Maness et al. | 433/68 |
| 5,035,637 | 7/1991 | Mathews et al. | 277/901 |
| 5,066,023 | 11/1991 | Ma | 277/2 |
| 5,072,316 | 2/1991 | Decker et al. | 277/235 B |

*Primary Examiner*—William A. Cuchlinski, Jr.
*Assistant Examiner*—Daniel G. DePumpo
*Attorney, Agent, or Firm*—Dressler, Goldsmith, Shore, Sutker & Milnamow, Ltd.

[57] ABSTRACT

A load sensing gasket having a gasket body defining a service opening for fluids and having a load sensor encased in a cavity in the body. The gasket body comprises a first gasket layer providing a first outer gasketing surface and a first inner surface, a second gasket layer providing a second outer gasketing surface and a second inner surface, the inner surfaces together defining the cavity and side walls for defining a perimeter for the cavity. The load sensor includes confronting electrodes and a pressure sensitive electrically resistive material between the electrodes and conductors extending outwardly of the perimeter. A seal between the first and second gasket layers around the load sensor seals the electrodes in the cavity from fluids when the gasket is in use.

12 Claims, 2 Drawing Sheets

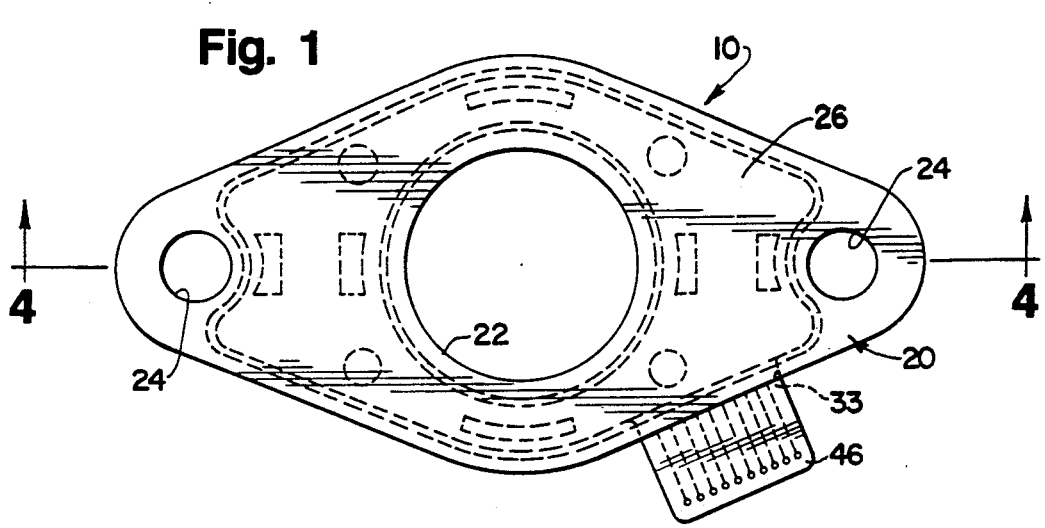
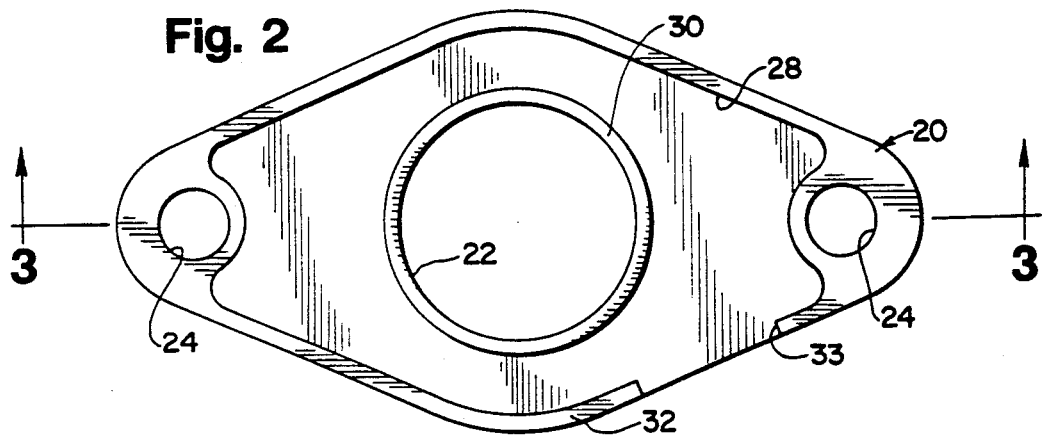
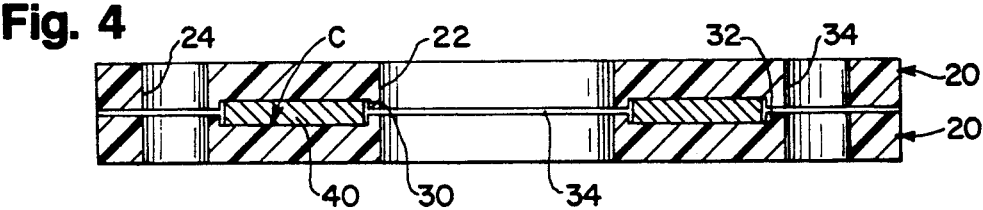

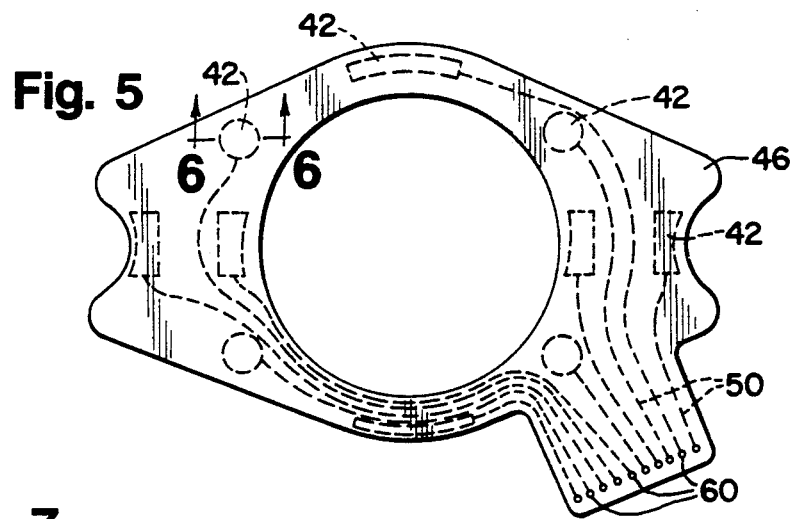
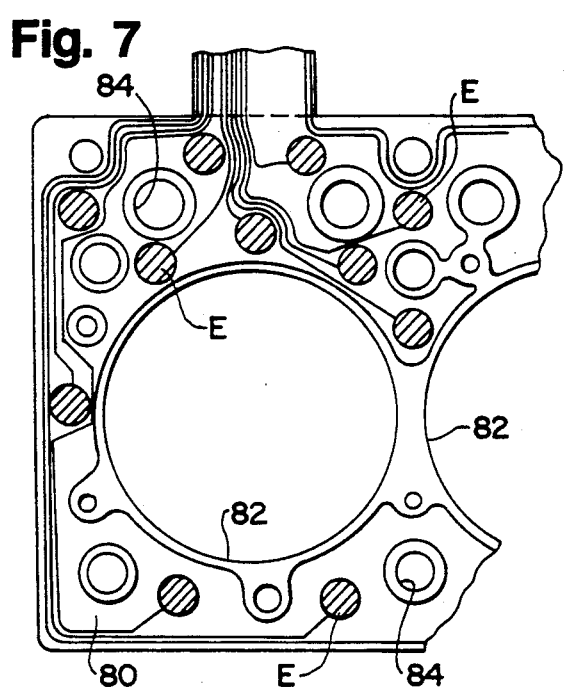
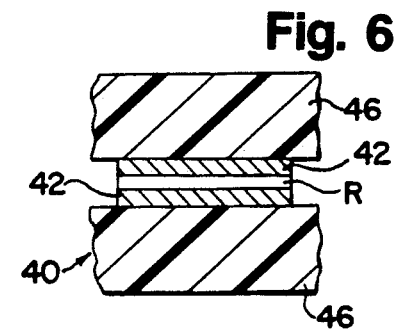
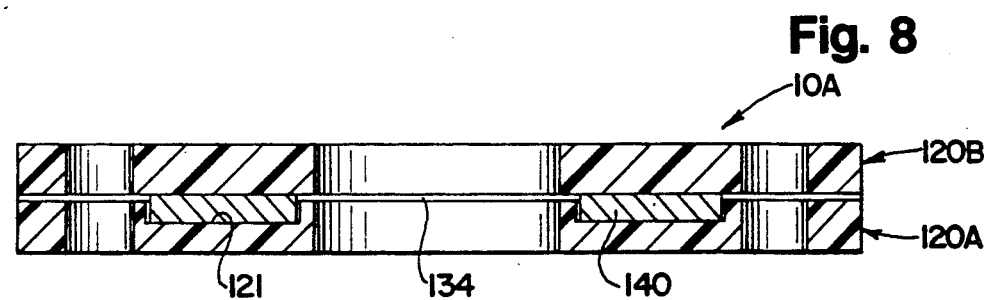
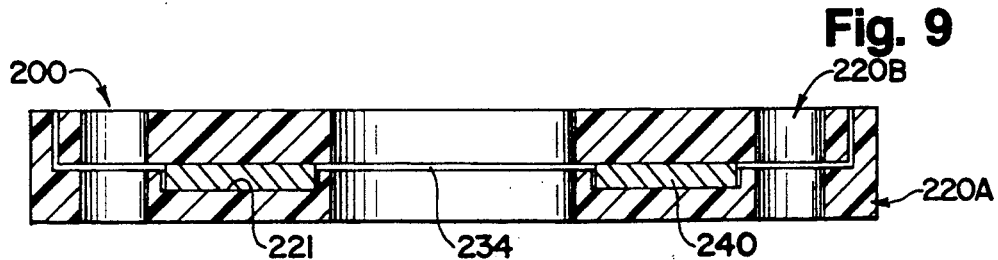

GASKET WITH ENCASED LOAD SENSOR

BACKGROUND OF THE INVENTION

Load sensors made in accordance with the principles of U.S. Pat. Nos. 4,734,034 and 4,856,993 have been suggested for use for sensing forces applied to gaskets, one such use being for automotive gaskets. Such environments are hostile, frequently both because of high temperature and pressure conditions, and because of conditions hostile to the film and other materials used for fabricating the sensors. Because of that such load sensors may not conveniently be used in many gasket environments. It would be of advantage to be able to use such sensors for a wide range of such applications, and particularly where fluids to which a gasket may be exposed in use would degrade the sensors or components thereof.

SUMMARY OF THE INVENTION

In accordance with the present invention an improved load sensing gasket assembly is provided. The gasket comprises a gasket body defining at least one service opening for fluids and having load sensing means encased in the body. The gasket body comprises a first gasket layer providing a first outer gasketing surface and a first inner surface, and a second gasket layer providing a second outer gasketing surface and a second inner surface. The inner surfaces define a zone, such as a cavity having confronting surface portions and side wall means defining a perimeter for the cavity. The load sensing means is disposed in the cavity.

The load sensing means comprises first electrode means in the cavity adjacent the one surface portion, second electrode means confronting the first electrode means and disposed adjacent the other surface portion, a pressure sensitive, electrically resistive material between the first and second electrode means, and conductors for the first and second electrode means extending outwardly of the cavity perimeter, with each conductor terminating in a contact.

Sealing means are provided between the first and second gasket layers around the load sensing means to seal the electrode means within the cavity from fluids when the gasket is in use.

Desirably the first and second gasket layers are plastic, and the first and second electrode means comprise multiple pairs of first and second electrodes, with the pairs being spaced from each other in the cavity. The load sensing means further may comprise a pair of thin sheets mounting the first and second electrode means, respectively, in their confronting relationship.

In one form, the first and second inner surfaces are spaced slightly apart from each other around the cavity so that when the gasket is loaded, compressive forces may be applied to the load sensing means without substantial forces being taken up by the gasket body. Thus the thickness of the load sensing means may be slightly greater than the combined depths of the recesses. In another form the load sensing means may be under load in the cavity.

Preferably the cavity entirely surrounds a service opening. The cavity may be defined in part by recesses in each of the first and second gasket layers or may be defined by one of the first and second gasket layers.

In one form a gasket assembly may include the gasket and a second gasket member of substantially larger size than the gasket for sealing a pair of confronting surfaces, in which the second gasket member defines an aperture configured to receive the gasket within that aperture.

Further objects, features and advantages of the present invention will become apparent from the following description and drawings.

BRIEF DESCRIPTION OF THE DRAWINGS

FIG. 1 is a load sensing gasket in accordance with the present invention;

FIG. 2 is a plan view of a gasket layer of FIG. 1;

FIG. 3 is a side elevational view of FIG. 2:

FIG. 4 is a cross-sectional view taken substantially along line 4—4 of FIG. 1;

FIG. 5 is a plan view of the load sensing gasket of FIG. 1;

FIG. 6 is a greatly enlarged, fragmentary schematic view taken along line 6—6 of FIG. 5;

FIG. 7 is a fragmentary view of a head gasket employing the principles of the present invention;

FIG. 8 is a view like FIG. 4 of another embodiment of the present invention; and FIG. 9 is a view like FIG. 4 of yet another embodiment of the present invention.

DETAILED DESCRIPTION OF THE PREFERRED EMBODIMENTS

Referring now to FIGS. 1 to 6, a load sensing gasket 10 of the present invention comprises a pair of plastic gasket layers 20 which are complementary to each other, and which are proportioned to cooperate with load sensing means to be described. In the embodiment of FIG. 1 the plastic gasket layers 20 may be mirror images and therefore may be essentially the same as each other. The plastic of which layers 20 are made may be, for example, fiber reinforced thermoplastic resin gasketing materials as described in U.S. Pat. No. 4,817,969, although other plastics having suitable temperature and other characteristics appropriate to particular gasketing applications may be used as well.

The gasket layers 20 of FIG. 1 define a central service opening 22 through which fluids may pass and a pair of bolt holes 24 for securing the gasket to confronting flanges. Each gasket layer 20 defines an outer main gasketing or sealing surface 26 and an inner surface which defines suitable recessing to house and accommodate a load sensing means. As best seen in FIGS. 2 and 3 each inner surface defines a recess 28 which is located between a flange 30 surrounding service opening 22 and a peripheral flange 32 which circumscribes the gasket layer 20 and which, at the ends of the gasket, incorporates the bolt holes 24. The peripheral flange defines a notch 33 at one edge to provide access to the conductor portion of the load sensor as will be described.

As illustrated by FIG. 4, together the flanges 30, 32 comprise side wall means defining a perimeter for a cavity C. The total height of the cavity is proportioned to cooperate with a sensing means such as the load sensor 40, which is disposed and encased therein.

The load sensor 40 may be made in accordance with the principles of U.S. Pat. Nos. 4,734,034 and 4,856,993. In a most preferred form, the confronting electrodes 42 forming multiple, spaced apart electrode pairs may be single cell contacts of a button or elongated element or other selected configuration with pressure-sensitive, electrically resistive, semi-conductive material R between them. One electrode 42 of each pair is disposed adjacent the inner surface of one gasket layer and the other electrode 42 of the pair is disposed adjacent the inner surface of the other gasket layer. As with the load sensors described in U.S. Pat. Nos. 4,734,034 and 4,856,993, the disclosures of which are here incorporated by reference, the load sensor 40 may comprise a pair of thin, preferably flexible, outer support sheets 46, confronting electrode pairs with a pressure sensitive, electrically resistive semi-conductive material R of the types described in the above-identified patents disposed between the electrode pairs, and conductors 50 leading outside of the cavity perimeter and gasket to contacts 60. In a preferred form the support sheets 46 may comprise polyester sheets about 1 mil thick and the electrodes and conductors 50 may be silk screened on the insides of the sheets 46 producing a load sensor of less than 5 mils in overall thickness. Contacts 60 are arranged to be positioned in a connector or reader to ascertain the outputs representative of the loading in the zones of the confronting electrode pairs. As such, changes in loads, hence resistance at the zones of the confronting electrode pairs may be processed and used to produce outputs representative of the forces applied at those zones. Although a unitarily formed load sensor is preferred for positioning in the cavity, it will be apparent that the operative elements of the load sensor may be disposed directly on the inner surfaces of the gasket layers defining cavity C.

Because the load sensing gasket 10 of the present invention may be disposed in hostile environments in which the gasket and load sensor 40 are exposed to high temperature and high pressure fluids which could degrade the load sensor or otherwise adversely affect its operation, it is important that the gasket layers 20 be bonded and sealed together around the load sensor to provide a leak tight cavity and assembly in use.

It is also important that the assembly of the gasket layers 20 with the sealing means 34 between them in the zones of the flanges 30 and 32 not provide any substantial resistance to their relative movement in the zone of the load sensor toward each other within the range of operation of the load sensor. A suitable sealing material is a hot melt film adhesive, of which 3M brand type 4060 is an example, deposited in a thickness of about 1 to 2 mils. In this embodiment the sealing material is positioned around the load sensor and between the inner surfaces of the gasket layers which are spaced slightly apart as illustrated in exaggerated form by FIG. 4. In this case it is apparent that the load sensor 40 is slightly greater in thickness than the combined depths of the recesses 28.

The arrangement of electrodes 42 illustrated obviously may be varied to accommodate the particular environment and the loading information desired. Individual electrodes 42 may be strategically located in desired locations and a greater or lesser number of electrode pairs may be used. Of course the nature and shape of the gasket body itself may vary. For example, a head gasket layer 80 showing an arrangement of electrode positions E positioned around combustion openings 82 and other service openings 84 is illustrated in FIG. 7. Such a gasket may otherwise be constructed in accordance with the description of the embodiment of FIGS. 1 to 6. Further, a gasket of the present invention may be used as an insert in an opening in another gasket of larger size in a zone in which it is desired to sense loads applied to the larger gasket.

In the embodiment of FIGS. 1 to 6, the plastic gasketing layers have been described as being essentially identical or mirror images of each other.

It is, of course, possible to provide a like load sensing gasket in which the recess in which the load sensor is disposed is defined by but one of the two confronting plastic gasketing layers. Thus, as illustrated by FIG. 8, a load sensing gasket 10A includes a first gasketing layer 120A defines a cavity 121 and the second gasketing layer 120B simply surmounts the first layer 120A. The cavity 121 is proportioned, like the cavity C, to receive a load sensor 140 which may be the same as load sensor 40. Again a sealing means 134 is disposed between the layers to provide a seal between the layers 120A, 120B to prevent intrusion of fluids into the cavity 121. The sealing means 134 is such that it does not interfere with the load sensor in use.

Another arrangement of the plastic gasketing layers is illustrated by FIG. 9. In FIG. 9 the load sensing gasket 200 has a cavity 221 which is defined by only one of the gasketing layers 220A, the other layer 220B not only surmounting the first, but also being freely (and with minimal frictional resistance) slideably received within gasketing layer 220A. In this instance the layer 220B projects slightly above the layer 220A so one layer may move relative to the other under compressive loading. Again the load sensor 240 may be the same as load sensor 40 and the bonding and sealing means 234 is formulated and positioned to avoid interference with the operation of the load sensor 240 in use.

It will be clear that the load sensing gaskets of the present invention are ones which can be used in hostile environments, such as those in which high temperature and high pressure fluids are encountered without exposing the encased load sensors to such liquids or gases during the intended life of the gasket. Where desired, the plastic gasket layers themselves may be used as a gasket without sensors simply by filling the recesses during fabrication or by filling them with a dummy sensor to fill the cavity. The provision of the recesses makes it possible to use a wide variety of load sensor configurations, i.e., arrangements of electrode pairs in a variety of selected locations, so that unit stresses and loads at such selected locations can readily be determined without otherwise altering the gasket layers themselves.

From the foregoing it will be apparent to those skilled in the art that modifications and variations of the specific embodiments described and illustrated may be made without departing from the spirit and scope of the present invention, and all such are intended to be embraced by the claims.

What is claimed is:

1. A load sensing gasket having a gasket body defining at least one service opening for fluids and having a load sensing means encased in said body, said gasket body comprising a first gasket layer providing a first outer gasketing surface and a first inner surface, a second gasket layer providing a second outer gasketing surface and a second inner surface, said inner surfaces defining a cavity having confronting surface portions and side wall means for defining a perimeter for said cavity, said load sensing means being disposed in said cavity, said load sensing means comprising first electrode means in said cavity adjacent said one surface portion, second electrode means confronting said first electrode means and disposed adjacent the other surface portion, a pressure sensitive electrically resistive material between said first and second electrode means, and conductors for said first and second electrode means extending outwardly of said perimeter, each said conductor terminating in a contact, and sealing means between said first and second gasket layers around said load sensing means to seal said electrode means within said cavity from fluids when the gasket is in use.

2. The gasket of claim 1, and wherein said first and second gasket layers are plastic.

3. The gasket of claim 1, and wherein said first and second electrode means comprise multiple pairs of first and second electrodes, said pairs being spaced from each other in said cavity.

4. The gasket of claim 1, and wherein said load sensing means further comprises a pair of thin sheets mounting said first and second electrode means, respectively, in said confronting relationship.

5. The gasket of claim 1, and wherein the first and second inner surfaces are spaced slightly apart from each other around said cavity so that when said gasket is loaded, forces may be applied to said load sensing means without substantial forces being taken up by the gasket body.

6. The gasket of claim 1, and wherein the thickness of said load sensing means is slightly greater than the depth of said cavity as defined by said gasket layers.

7. The gasket of claim 1, and wherein said cavity entirely surrounds a service opening.

8. The gasket of claim 1, and wherein said cavity is defined in part by recesses in each of said first and second gasket layers.

9. The gasket of claim 1, and wherein said cavity is a recess defined by one of said first and second gasket layers.

10. A load sensing gasket having a gasket body defining at least one service opening for fluids and having a load sensing means encased in said body, said gasket body comprising a first plastic gasket layer providing a first outer gasketing surface and a first inner surface, a second plastic gasket layer providing a second outer gasketing surface and a second inner surface, said inner surfaces defining a zone having confronting surface portions, said load sensing means being disposed in said zone, said load sensing means comprising first electrode means in said zone adjacent said one surface portion, second electrode means confronting said first electrode means and disposed adjacent the other surface portion, a pressure sensitive electrically resistive material between said first and second electrode means, and conductors for said first and second electrode means extending outwardly of said zone, each said conductor terminating in a contact, and sealing means between said first and second inner surfaces around said load sensing means to seal said electrode means within said zone from fluids when the gasket is in use.

11. The gasket of claim 10, and wherein said first and second electrode means comprise multiple pairs of first and second electrodes, said pairs being spaced from each other in said zone.

12. The gasket of claim 10, and wherein said zone entirely surrounds a service opening.

* * * * *